Oct. 29, 1968 P. C. KESLING 3,407,500
TOOTH POSITIONER
Filed May 6, 1966
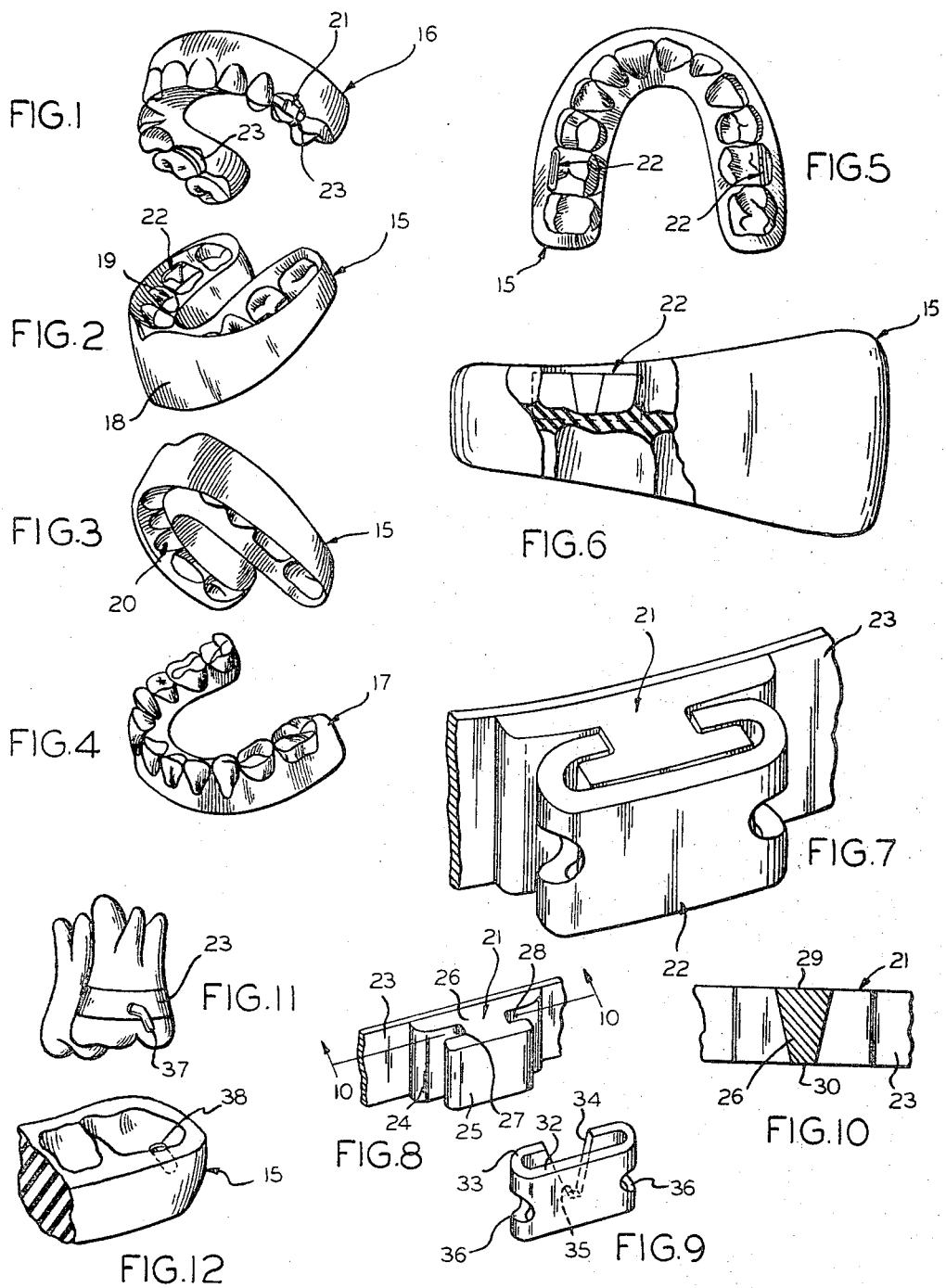
INVENTOR
PETER C. KESLING
BY
Marzell, Johnston, Cook & Root
ATTORNEYS

United States Patent Office 3,407,500
Patented Oct. 29, 1968

3,407,500
TOOTH POSITIONER
Peter C. Kesling, Green Acres, La Porte, Ind. 46350
Filed May 6, 1966, Ser. No. 548,130
10 Claims. (Cl. 32—14)

This invention relates in general to a tooth positioner, and more particularly to a tooth positioner employed for orthodontic treatment.

Heretofore, tooth positioners for orthodontic treatment of the type similar to the present invention, such as the one shown in U.S. Patent No. 2,531,222, have encountered the difficulty of proper placement within the patient's mouth and seating against the teeth. For example, a tooth positioner according to the present invention and one of the type disclosed in the aforementioned patent is constructed to urge certain teeth within the patient's mouth into preselected positions, thereby demanding elongation and/or stretching of the positioner when placing it in the mouth in order to properly position and seat the positioner against the teeth. If the positioner is not properly placed and positioned within the mouth relative to the teeth, the usefulness thereof is materially impaired.

Some of the problems in the aforementioned patent are overcome by the tooth positioner disclosed in U.S. Patent No. 3,178,820, by the introduction of clips for engaging the embrasure areas of the teeth. The clips are embedded in the body of the appliance and resiliently snapped into place relative to the teeth in the patient's mouth. However, alignment of the cavities or impressions in the tooth positioner relative to the teeth is still difficult inasmuch as the contact of the clips with the teeth is minimal. Further, it is not possible to readily effect rotation of any teeth by the positioner of this patent, and especially the cuspids that are nearly round at their base.

The tooth positioner of the present invention is made like the positioners disclosed in the aforementioned patents, and additionally includes positive coupling or mating means adapted to coact and engage with positive coupling or mating means mounted on one or more teeth in the patient's mouth to thereby assure better seating of the positioner and thereby provide an opportunity to rotate teeth, especially the cuspids.

It is therefore an object of the present invention to provide a new and improved tooth positioner.

Another object of the present invention is in the provision of a tooth positioner that includes means for positively locking same in place in a patient's mouth.

Still another object of the present invention is to provide a tooth positioner having a positive locking or coupling member that is adapted to mate and coact with a positive locking or coupling member mounted on one or more teeth in the patient's mouth.

A further object of the present invention resides in the provision of a tooth positioner having means capable of effecting rotation of one or more teeth in a patient's mouth to a greater degree than heretofore known.

Other objects, features and advantages of the invention will be apparent from the following detailed disclosure, taken in conjunction with the accompanying sheet of drawing, wherein like reference numerals refer to like parts, in which:

FIG. 1 is a perspective view of a model of teeth from the upper arch of a person which represents the upper teeth thereof, and which has the positive locking or coupling means mounted thereon according to the present invention;

FIG. 2 is a top perspective view of a tooth positioner constructed in accordance with the present invention and illustrating the impressions or cavities for the upper arch;

FIG. 3 is a bottom perspective view of the tooth positioner according to the present invention and illustrating the cavities or impressions of the lower arch;

FIG. 4 is a perspective view of a model of the teeth from the lower arch of a person;

FIG. 5 is a plan view of the tooth positioner according to the present invention and showing the cavities or impressions from the upper arch;

FIG. 6 is a side elevational view of the tooth positioner according to the present invention, with some parts broken away thereby showing some parts in section and other parts in phantom relative to the present invention;

FIG. 7 is a perspective view of the coacting locking elements employed in the present invention and removed from the positioner and the teeth of a patient for purposes of clarity;

FIG. 8 is a perspective view of a locking or coupling member according to the present invention and adapted to be mounted on the tooth of a person;

FIG. 9 is a perspective view of the locking member or element that is adapted to be embedded in the tooth positioner of the present invention for coacting with the element adapted to be mounted on the tooth of a person;

FIG. 10 is a sectional view taken substantially along line 10—10 of FIG. 8;

FIG. 11 is a perspective view of teeth from a patient's mouth and showing an embodiment of the invention that is modified from the embodiment in FIGS. 1–10; and FIG. 12 is a fragmentary view of a tooth positioner having a mating member adapted to coact with that shown on the tooth in FIG. 11.

Referring now to the drawings, and particularly to FIGS. 1–4, a tooth positioner according to the present invention is generally indicated by the numeral 15, and which is adapted to be worn by a person in engagement with the upper and lower teeth as illustrated by the models of the upper and lower arches generally indicated by the numerals 16 and 17. The tooth positioner 15 includes a resilient body 18, preferably of rubber, although any other suitable material may be used, having impressions or cavities 19 for the teeth of the upper arch 16 and impressions or cavities 20 for the teeth of the lower arch 17. While the tooth positioner 15 illustrated herein includes impressions or cavities for the upper and lower teeth of a person, and for all of the teeth on the upper and lower arches, it should be appreciated that a tooth positioner could be constructed which would only have an impression for either the upper teeth or the lower teeth, or a portion of the upper or lower teeth or any combination thereof.

The tooth positioner of the present invention differs from the prior art in that it includes means for positively seating the impressions or cavities of the positioner relative to the teeth of a patient and for locking the positioner in place. Further, the means employed may serve to provide rotation of one or more teeth by use of the tooth positioner of the present invention. The means illustrated for positively placing the tooth positioner into the mouth of a person so that the impressions or cavities positively engage the teeth of a person include a locking or coupling member 21 mounted on the tooth of a person, and a locking or coupling member 22 embedded in the body 18 of the tooth positioner and secured thereto so that when the members mate and coact together as shown in FIG. 7, the cavity or impression of the tooth in the positioner will properly receive and seat the tooth of the person's mouth.

While the locking or coupling member 21 may be secured in any simple fashion on the tooth of a person, it may be suitably welded or soldered to a band 23 that is fastened to the tooth in the usual manner such as by a suitable adhesive or the like.

While a set of coacting locking members 21 and 22 are generally preferred to be arranged so that there is one in each quadrant of the mouth, that is one on each side for the upper arch and one on each side for the lower arch, it would require one to be positioned where a tooth would need rotating additionally or in substitution for another unit. For example, the cuspids which have conical shaped crowns, and which might be desired to be rotated in a patient's mouth could have a locking member 21 mounted thereon for coaction with a locking member 22 arranged in alignment therewith on the impression for receiving the cuspid and so that rotation of the cuspid tooth could be effected. It should be appreciated that the cuspid tooth of the person would need rotation and that it would be arranged to bring it into proper alignment with the tooth positioner. It should be further appreciated that one or more sets of locking or coupling members could be employed on any one tooth positioner.

While the locking or coupling members may take any desired form, one that would be satisfactory is illustrated particularly in FIGS. 7-10 wherein the locking member 21 adapted to be secured to the tooth band 23 includes a base 24 that abuts against the band 23, a head portion 25 parallel spaced from the base 24 and interconnected thereto by means of a web portion 26 that is of a lesser width than the head to define oppositely directed slots 27 and 28. The web portion 26 is tapered from the gingival edge 29 to the occlusal edge 30.

The locking member 22 that is adapted to be embedded in the body 18 of the tooth positioner 15 appears as seen in FIG. 9 as a wrap-around member having a socket 31 within which is received the head 25 of the locking member 21, and which is defined by substantially parallel spaced outer and inner side walls 32 and 33 interconnected at their opposite edges thereof. The inner side wall is provided with a tapered slot 34 having a bottom edge 35 against which the occlusal end 30 of the web portion 22 seats when the locking member 21 is properly received by the locking member 22. The tapered web portion 26 and the tapered slot 34 enhance the ease with which the locking member 21 is received in the locking member 22 and therefore provides some guidance between the members. The opposite edges of the locking member 22 may be cut out at 36 to enhance the gripping of the member relative to the body of the tooth positioner. Actually the locking member 22 may be molded in the rubber or body of the positioner when the positioner is made. Thus, the locking member 22 would become somewhat an integral part of the positioner.

The locking members 21 and 22 are made of rigid material such as metal or a rigid plastic. While the embodiment of FIGS. 6-10 shows that the locking member 21 is mounted on a tooth and the locking member 22 is embedded in the positioner, it should be appreciated that the reverse could be true wherein the locking member 21 would be secured to the positioner and the locking member 22 could be mounted on a tooth in the mouth of the person.

Another embodiment of this invention is shown in FIGS. 11 and 12 wherein a male member 37 is shown secured to a band 23 on one tooth to coact with a female socket member 38 that is embedded in the body of the positioner 15A. When bringing the positioner into engagement with the teeth, the male member 37 would then engage in the female member 38 and properly position the impressions in the positioner relative to the teeth. Again, the male and female members would be made of a rigid material, and they may be reversed as to mounting one on the teeth and the other in the positioner.

Thus it is seen that the positioner of the present invention provides proper alignment of the positioner cavities relative to the teeth and positive holding of the positioner relative to the teeth so that better control over one or more teeth may be provided plus locking the positioner in place. Further, it is possible to move the roots of teeth with the means of the present invention when using a tooth positioner.

It will be understood that modifications and variations may be effected without departing from the scope of the novel concepts of the present invention, but it is understood that this application is to be limited only by the scope of the appended claims.

The invention is hereby claimed as follows:

1. A tooth positioner comprising, a molded arch-shaped body of resilient material, said body being formed to fit within the mouth of a person between the upper and lower arches thereof and to apply straightening pressures to at least some of the teeth, said body including impressions of the teeth of at least one of the arches wherein at least some of the impressions are in reset position, said impressions having a bottom and opposite side walls, and a rigid coupling member supported by said body and adapted to mate with a rigid coupling member mounted on a tooth of the person when the positioner is positioned within the mouth of a person.

2. A tooth positioner as defined in claim 1, wherein a plurality of rigid coupling members are supported by said body, each of which is adapted to mate with a rigid coupling member mounted on a tooth of the person when the positioner is positioned and seated on the teeth of a person.

3. A tooth positioner as defined in claim 1, wherein the rigid coupling member supported by said body is a male member.

4. A tooth positioner as defined in claim 1, wherein the rigid coupling member supported by said body is a female member.

5. A tooth positioner as defined in claim 1, wherein the rigid coupling member supported by said body includes a socket defined by opposite side wall interconnected at their ends by end walls.

6. A tooth positioner as defined in claim 5, wherein one of the said side walls is provided with guiding means for guiding engagement of the coupling member mounted on a tooth.

7. A tooth positioner as defined in claim 1, wherein said rigid coupling member includes a tubular body.

8. In combination with first rigid coupling means mounted on the teeth in the mouth of a person a tooth positioner including a molded arch-shaped body of resilient material formed to fit within the mouth of a person between the upper and lower arches thereof and to apply straightening pressures to at least some of the teeth, impressions of the teeth of at least one of the arches wherein at least some of the impressions are in reset position, said impressions having a bottom and opposite side walls, and second rigid coupling means supported by said body in one of the side walls of an impression adapted to mate with the first coupling means mounted on the teeth when the positioner is properly placed and seated within the mouth.

9. The combination as defined in claim 8, wherein said second coupling means includes a socket member and said first coupling means includes a mating member fitting snugly within said socket member.

10. The combination as defined in claim 9, wherein said second coupling means includes guide means coacting with guide means on said first coupling means to facilitate engagement therebetween.

References Cited

UNITED STATES PATENTS

| | | | |
|---|---|---|---|
| 2,479,780 | 8/1949 | Remensnyder | 32—14 |
| 2,705,006 | 3/1955 | Cettel et al. | 128—136 |
| 2,789,351 | 4/1957 | Gordon | 32—14 |
| 3,178,820 | 4/1965 | Kesling | 32—14 |

LOUIS G. MANCENE, *Primary Examiner.*

C. R. WENTZEL, *Assistant Examiner.*